May 24, 1938.  G. McCUE  2,118,093
DEVICE FOR POSTURE STUDY
Filed Jan. 26, 1937  4 Sheets-Sheet 1

May 24, 1938. G. McCUE 2,118,093
DEVICE FOR POSTURE STUDY
Filed Jan. 26, 1937 4 Sheets-Sheet 3

May 24, 1938.  G. McCUE  2,118,093
DEVICE FOR POSTURE STUDY
Filed Jan. 26, 1937     4 Sheets-Sheet 4

Inventor
Gerald McCue
By Rockwell & Barthelow
Attorneys

Patented May 24, 1938

2,118,093

UNITED STATES PATENT OFFICE 2,118,093

DEVICE FOR POSTURE STUDY

Gerald McCue, New Haven, Conn., assignor to The Berger Brothers Company, New Haven, Conn., a corporation of Connecticut Application January 26, 1937, Serial No. 122,427

18 Claims. (Cl. 35—28)

This invention relates to jointed figures or manikins, and more particularly to a two-dimensional figure having parts of the form and shape of the human body in profile, which parts are pivotally or flexibly joined together at points approximating joints of the human body, so that parts of the figure may be moved to various positions illustrating accepted correct and incorrect postures of the body.

The correct erect posture of the human body is well recognized as are also certain well-known types of incorrect posture, and the latter, particularly with respect to that part of the body around the abdominal region, may be corrected, or at least greatly benefited, by a properly designed corset or belt.

It is, therefore, of great advantage to corsetieres and fitters of such garments to know the position of various parts of the body in the correct and incorrect postures, and to understand the principles of correction thereof, and it is to a device for illustrating various incorrect postures of the body that the present invention relates.

As illustrated, the device comprises a two-dimensional figure jointed as described, and connected to or mounted upon a support. In the form shown, the pivot elements serving to pivotally connect the various parts of the figure also serve to connect the figure to the support, and to these pivot points is connected an actuating member which, when manually operated, will effect a movement of these pivot points, and therefore the parts of the figure connected by these points automatically to certain positions; that is, these pivot points are connected to a single actuator in such a manner that the parts of the figure will be moved in unison from one posture to another.

By this arrangement not only is it unnecessary to move each part of the figure individually, which would require considerable time and effort, but the connections are such that the parts will always be moved to the desired positions, so that for any given posture, such, for example, as the fatigue posture, it will be impossible to have one part in an improper position and the remaining parts in the proper position for such posture.

It is also contemplated to provide indicating means responsive to the actuating member, which means will indicate to the user of the device the posture assumed by the parts of the figure when moved to a predetermined position.

One object of the present invention is the provision of a jointed figure simulating the form of the human body in profile, the parts of which are mounted upon a support and pivotally joined together at points approximating joints of the human body, and means controlling the parts of the figure to move them to various positions of posture.

A still further object of the invention is the provision of a jointed figure simulating the form of the human body in profile, the parts being flexibly joined together in such a manner that they may be placed in various recognized positions of incorrect posture as well as correct posture, and providing means for simultaneously moving the parts to said positions.

A still further object of the invention is the provision of a jointed figure of the character described, the parts of the figure being mounted upon a support, and actuating or controlling means for moving the parts of the figure relatively to the support to various positions of posture, and automatically indicating to the user the posture of the figure when the parts are in a predetermined position.

More specifically the invention comprises a supporting member provided with slots in which are movably mounted pivot elements serving as pivots for a jointed figure representing the human body in profile, the pivots being provided at points approximating joints of the human body, and means for moving these pivots within the slots of the support to cause the figure to assume various postural positions upon the actuation of the moving means.

To these and other ends the invention consists in the novel features and combinations of parts to be hereinafter described and claimed.

Figure 1:
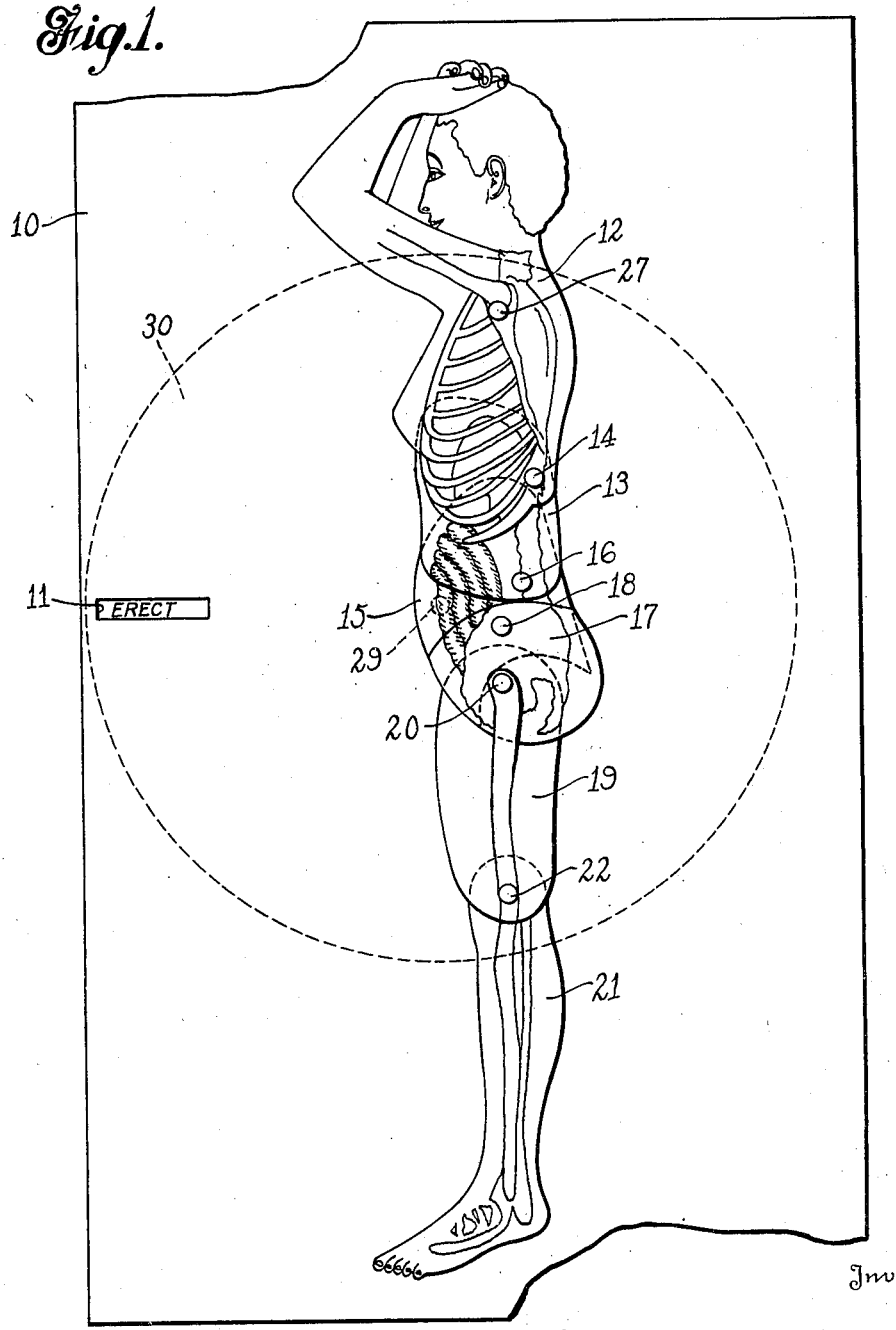
Fig. 1 is a front elevational view of a jointed figure embodying my improvements.

To illustrate a preferred embodiment of my invention, I have shown a support 10 which is in sheet form and may be made of any rigid or stiff material, such as a sheet or stiff cardboard, for example. This sheet serves as the support for the jointed figure, and also for the controlling member or actuator, as will be hereinafter described, the figure being mounted upon the front of the support, as shown in Fig. 1, and the actuator being mounted at the rear of the support, as shown in this figure.

The support is provided with a slot 11 through which may be seen an indicating word or character, thus indicating the posture assumed by the parts of the figure when the latter are in a predetermined position. As shown in Fig. 1, the word "Erect" appears in this slot, thus indicating that in that figure the body is shown in erect position.

Attached to the support 10 is a two-dimensional figure composed of various parts representing the appearance or outline of the human body in profile. These parts comprise a head and chest portion 12, a diaphragm portion 13 pivoted at 14 to the portion 12, an abdominal portion 15 pivoted at 16 to the diaphragm portion, a hip section 17 pivoted to the abdominal portion at 18, an upper leg section 19 pivoted to the hip section at 20, and a lower leg section 21 pivoted to the upper leg section at 22. The various parts of the figure are not only pivoted to each other as described, but are also connected to the support 10, these connections for the most part being movable so that the parts of the figure may move relatively to the card. If the user of the device, as is the case in the present instance, is interested principally in the portions of the figure above the leg sections, the lower leg section 21 may be secured to the card by adhesive or the like so that it is not movable. It will be understood that these sections of the figure are flat, plane sections of two dimensions and may be formed of any sheet material, such as cardboard or celluloid, for example.

If, as in the present case, the leg portion 21 is fixed to the support 10, the pivot 22 need only extend through the portions 19 and 21, but may extend through the support as well, although as shown this pivot is not movable with respect to the support. The pivots 14, 16, 18, and 20 not only extend through and pivotally connect the adjacent body sections or sections of the figure, but also extend through slotted openings in the support 10, so as to connect the parts of the figure to the support and provide for movement of these parts not only about their pivots, but, in addition, to permit the pivots to move with respect to the support. These slotted openings are shown more particularly in Fig. 3, and by comparison with Fig. 1 it will be apparent that the pivot member 14 extends through the slot 23, the pivot 16 through the slot 24, and the pivots 18 and 20 through the slots 25 and 26, respectively. Referring again to Fig. 3, it will be seen that the slots 25 and 26 are elongated and somewhat arc-shaped, while the slots 23 and 24 are of angular shape, the latter permitting the pivot members 14 and 26 to move not only laterally but vertically with respect to the supporting member 10.

The head and chest section 12 is connected to the support adjacent the shoulder portion of the figure by a pivot member 27 which passes through the portion 12 and through an elongated slot 28 in the support 10. The slot 28 is elongated in a vertical direction with respect to the support 10, so as to permit this portion of the figure to move vertically with respect to the support.

Figure 5:
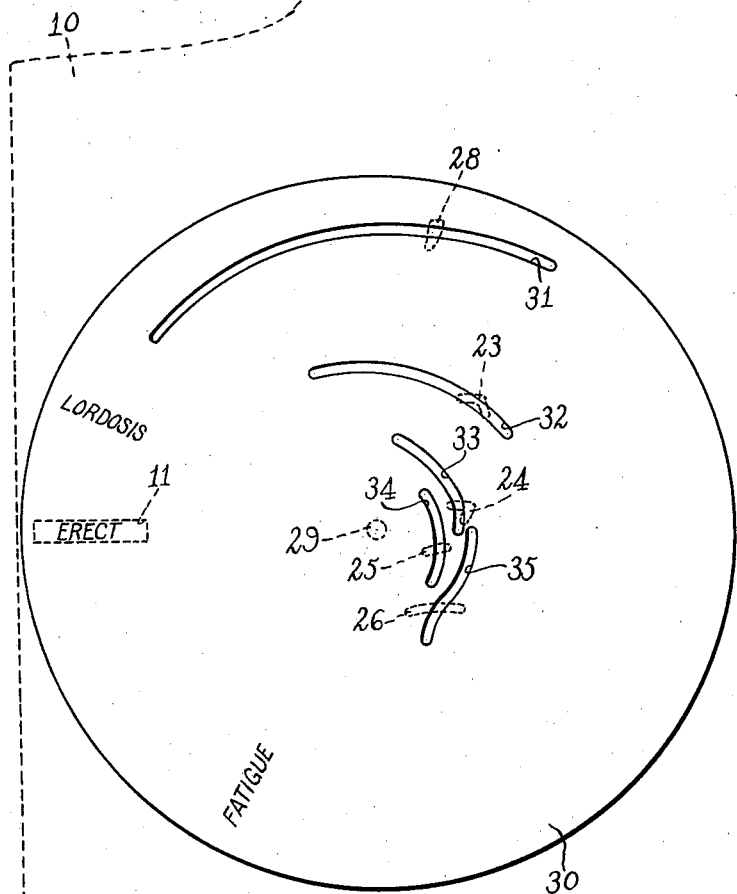
Fig. 5 is a view of the actuating or controlling member in the form of a disk, the support being shown in dotted lines.

Rotatably or pivotally attached to the rear side of the support 10 by means of the pivot 29 is a controlling or actuating member 30, shown more particularly in Fig. 5, and, as shown, this member is in the form of a circular disk. It will, as stated, be applied at the rear side of the supporting member on the side opposite the sections of the jointed figure, and the face of the member 30 next to the rear surface of the support 10 bears indications such as "Lordosis", "Erect", and "Fatigue", corresponding to certain predetermined positions of posture which the parts of the figure may be caused to assume. It will be understood that these indicia are designed to be brought into registration with the slot 11 so as to be visible through this slot to the user of the device when viewing the support from the front or the side upon which the figure is mounted.

The controlling or actuating disk 30 is provided with a plurality of cam slots 31, 32, 33, 34, and 35, through which extend respectively the pivots 27, 14, 16, 18, and 20, so that these pivot members not only extend through the parts of the figure and through the support 10, but also through the slots in the actuating or controlling disk 30. Moreover, owing to the cam shape of these slots, it will be seen that, as the member 30 is rotated, the pivot members will be moved as is permitted by the slots 23, 24, 25, 26, and 28 in the support member 10, the position of the pivot members at any one position of the controlling disk 30 being, of course, defined by the point of intersection of the slots in the disk 30 with the slots in the support 10.

Figure 2:
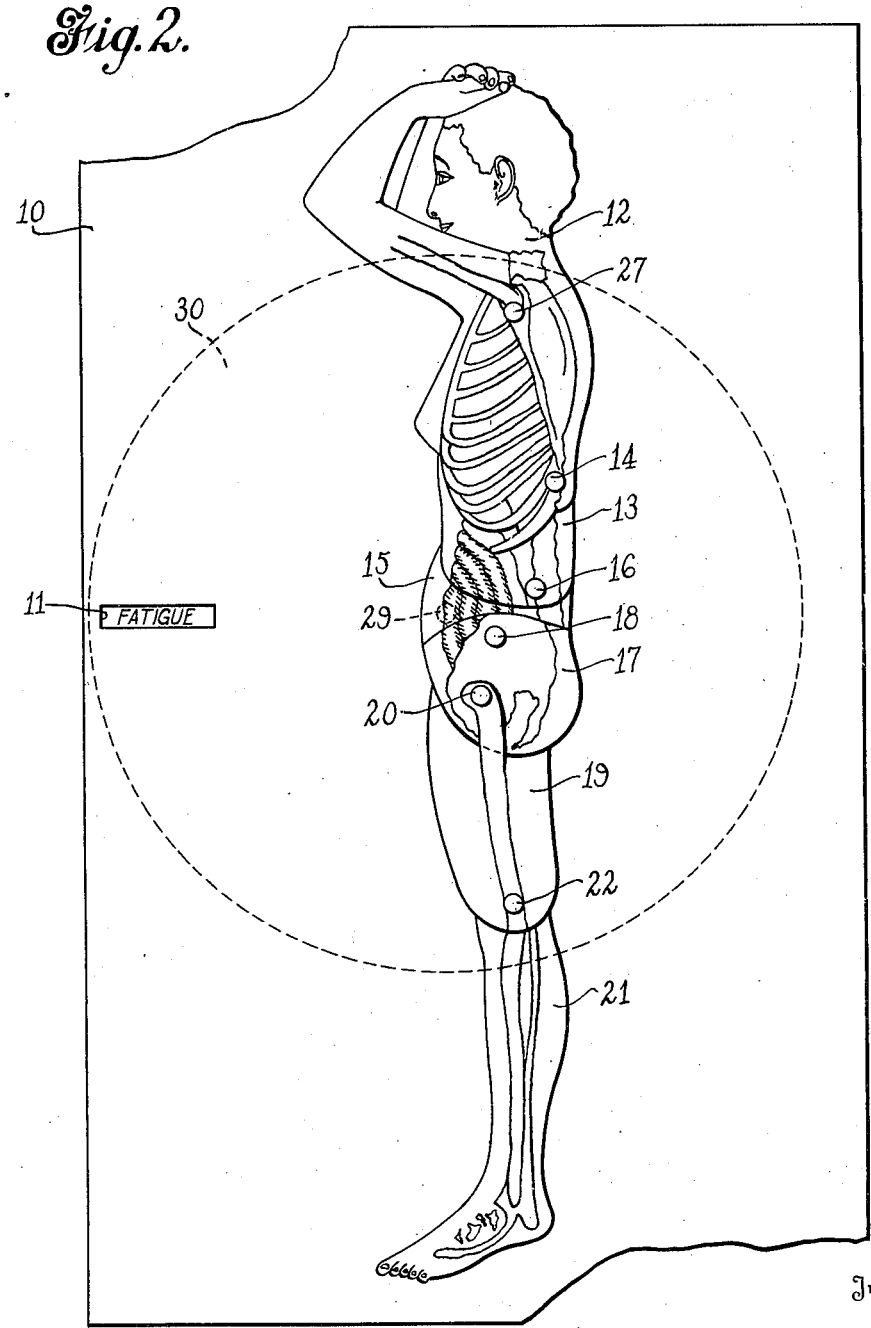
Fig. 2 is a view similar to Fig. 1 showing the parts in a different position.

As shown, for example, in Figs. 1 and 2, various parts of the anatomy, such as the ribs, the intestines, and parts of the skeleton may be represented upon the corresponding sections of the figure, so that the positions of these organs of the body will be more or less truly depicted when the figure is caused to assume the various positions of posture.

The operation of the device may briefly be summed up as follows: The user may hold the support 10 in his hand so that he views the front surface thereof, as shown in Fig. 1, the jointed figure being upon that side of the support toward the observer. The actuating disk 30 is on the back of the support and no part of it will be visible except a small area through the window or slot 11. The user may revolve the disk 30 about its pivot 29 until the word "Erect" appears in the slot 11. The parts of the figure will then be in erect position. This position of the actuating disk 30 is shown in Fig. 5, wherein it will be seen that an intermediate point of the slots 23, 24, 25, 26, and 28 of the support 10 is crossed by the slots 31 to 35, inclusive, in the disk 30 at an intermediate point in the latter slots. The latter slots, being cam shaped, will hold or move the pivot elements 14, 16, 18, 20, and 27 to the proper locations to cause the parts of the jointed figure to assume an erect position, and this position will be indicated to the observer by the appearance of the word "Erect" in the slot 11. If the user then turns the disk counterclockwise from the position shown in Fig. 1 until the word "Lordosis" appears within the slot 11, the parts of the figure will be caused to assume the position known as lordosis posture. In this position, the pivot members will lie in the right-hand ends of the slots 31 and 32 and the lower ends of the slots 33, 34, and 35, as viewed, for example, in Fig. 5. The movement of the disk 30 will, by reason of the eccentric or cam shape of these slots, effect a movement of the pivot members within the slots 23, 24, 25, 26, and 28 of the support 10, so as to move the sections of the jointed figure to the new position illustrated in Fig. 3.

If it is desired to study another position of the figure, such as the fatigue position, the disk 30 is moved in a clockwise direction from the position shown in Fig. 1, until the indication "Fatigue" appears in the slot 11. At this time the pivot members will lie at the ends of the slots 31 to 35, inclusive, opposite that shown in the lordosis position, and again these pivot members will have been moved within the slots in the support 10, so as to move the various body sections to the position shown in Fig. 2, designated as "Fatigue."

It will be apparent that by the actuation of a single member, a plurality of sections of the jointed figure are moved from one position to another, and it will be obvious that these movements are so articulated that the result of the movement will place the entire figure in one of the recognized types of posture. It will, through the use of the device, be impossible, for example, to have several sections of the body in the position assumed in a given posture, and one or more sections of the body in an improper position for such posture. Moreover, the indicating means for the various positions of posture of the figure is responsive to the movement of the actuating disk 30, so that it will, in any position, correctly indicate this position to the observer.

Figure 3:
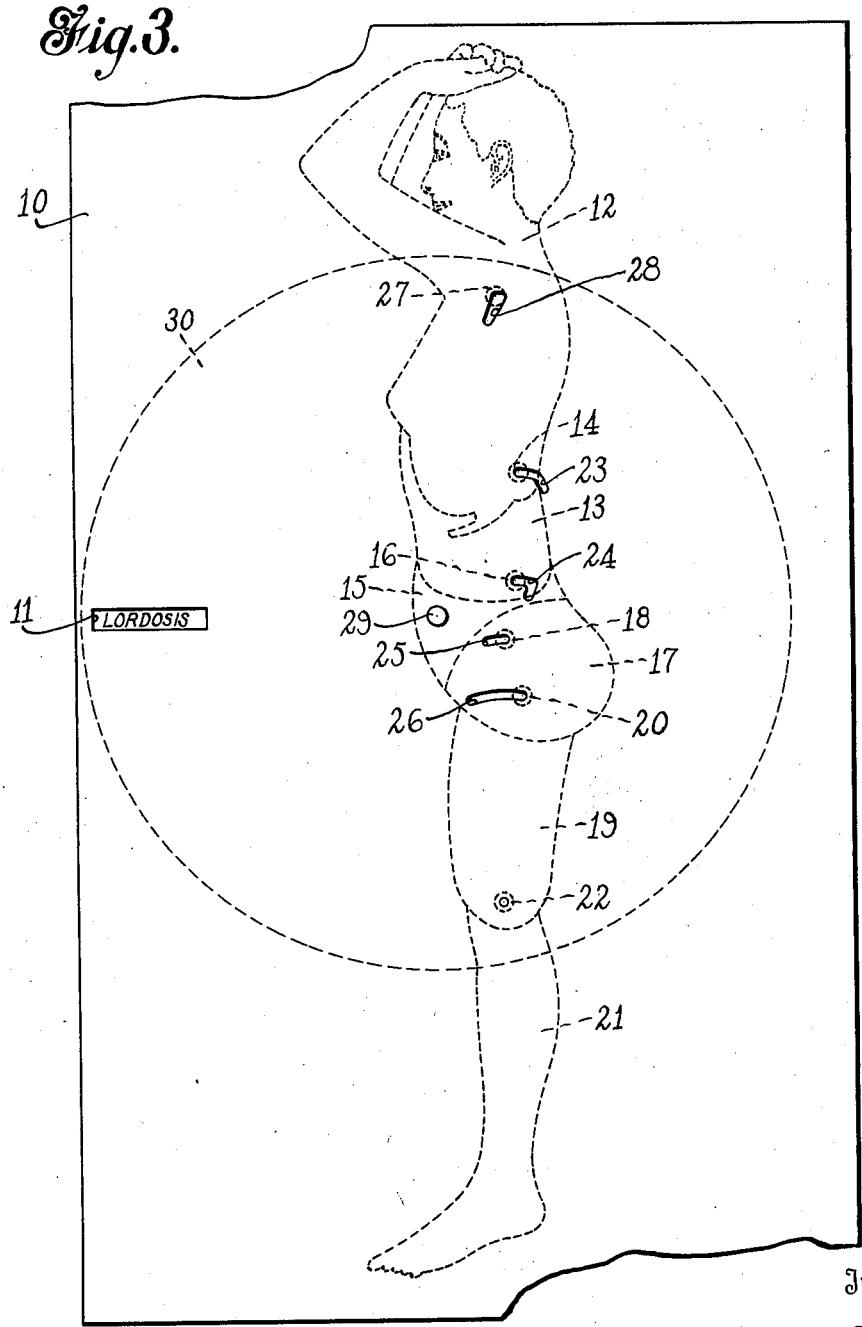
Fig. 3 is a front elevational view of the support upon which the figure is mounted, the figure being shown in dotted lines in a third position of posture.
Figure 4:
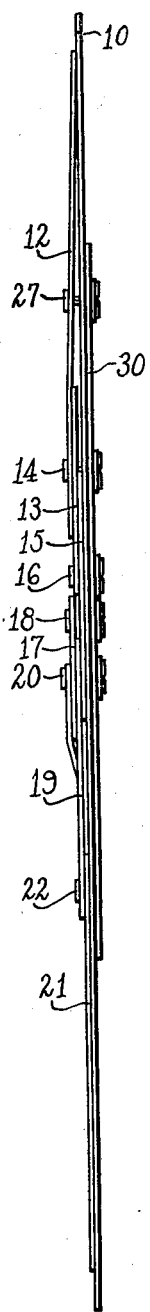
Fig. 4 is a side elevational view of the device as shown in Figs. 1 and 2.

It will be noted that the movement given to the pivot elements of the figure, and through them to the various sections composing the figure, will be controlled by the joint action of the slots in the support 10, as shown in Fig. 3, and the cam slots in the actuator 30, as shown more especially in Fig. 5, and that by the proper shaping of the slots the figure may be caused to assume almost any position which is desired. Three positions are shown, but these, of course, are only by way of illustrating some of the applications of the principles of the invention.

While I have shown and described a preferred embodiment of my invention, it will be understood that it is not to be limited to all of the details shown, but is capable of modification and variation within the spirit of the invention and within the scope of the appended claims.

What I claim is:

1. A support, a figure supported thereby having the profile contour of the human body, said figure comprising a plurality of sections relatively movable to exhibit different body postures, and an actuating member having independent connections with a plurality of said sections to move the latter simultaneously to any of a number of predetermined positions corresponding to different postures.

2. A support, a figure supported thereby having the contour of the human body, said figure comprising a plurality of sections relatively movable to exhibit different body postures, and an actuating cam member having independent cam connections with a plurality of said sections to move the latter simultaneously to predetermined positions corresponding to different postures.

3. A support, a figure supported thereby having the profile contour of the human body, said figure comprising a plurality of sections relatively movable to exhibit different body postures, and an actuating member having independent connections with a plurality of said sections to move the latter to predetermined positions corresponding to postures of the human body known as erect, fatigue and lordosis, respectively.

4. A support, a figure supported thereby having the contour of the human body, said figure comprising a plurality of sections movable with respect to each other and with respect to the support to exhibit different body postures, cooperating guiding means on said support and on a plurality of said sections to control the movement of the latter, and means to effect simultaneous movement of said sections under control of said guiding means to positions corresponding to different postures.

5. A support, a figure supported thereby having the contour of the human body, said figure comprising a plurality of plane sections movable about a plurality of pivots with respect to each other and with respect to the support to exhibit different body postures, cooperating guiding means on said support and on a plurality of said sections to control the movement of the latter, means to move said sections, and means to attach each of certain of said sections to the support and also to said moving means.

6. A support, a figure supported thereby comprising a plurality of plane sections movable with respect to each other and with respect to the support to exhibit different body postures, means attaching a plurality of said movable sections to said support independently, means on said support serving to control the movement of said sections relatively thereto, and an actuating member carried by said support to effect movement of said sections simultaneously under control of said controlling means to positions corresponding to different postures.

7. A support, a figure supported thereby comprising a plurality of plane sections movable with respect to each other and with respect to the support to exhibit different body postures, means attaching a plurality of said movable sections to said support independently, means on said support serving to control the movement of said sections relatively thereto, and an actuating cam member carried by said support to effect simultaneous movement of said sections under control of said controlling means, said sections being mounted upon one face of said support and said actuating cam member being mounted on the opposite face thereof.

8. A support, a figure supported thereby having the contour of the human body, said figure comprising a plurality of sections relatively movable to exhibit different body postures, and a rotatable actuating member having independent connections with a plurality of said sections to move the latter simultaneously to any of a number of predetermined positions corresponding to different postures.

9. A support, a figure supported thereby having the contour of the human body, said figure comprising a plurality of sections movably secured together, an actuating member having independent connections with a plurality of said sections to move the latter to predetermined positions, and indicating means to indicate the positions assumed by said figure sections, said indicating means being responsive to the movement of said actuating member, said actuating member being mounted upon the rear side of said support, and the latter having an opening, and said indicating means being carried by said actuating member and visible through said opening.

10. A support, a figure supported thereby comprising a plurality of sections pivoted together, said support having a plurality of guide slots therein, means on certain of said sections extending into said guide slots whereby the movement of said sections relatively to the support is controlled, and an actuating member movably carried by the support and engaging the means extending into the slots in the support to effect movement of the sections upon which these members are mounted under control of said guide slots.

11. In a device of the character described, a support, a figure supported thereby having the contour of the human body, said figure comprising a plurality of sections, an actuating member movably carried by said support, said actuating member being provided with cam slots, said support member being provided with guide slots, pivot pins pivotally securing the sections of said figure together, and said pivot pins extending through said guide slots and through said cam slots whereby movement of said sections is under joint control of both of said series of slots.

12. In a device of the character described, a support, a figure supported thereby having the contour of the human body, said figure comprising a plurality of sections, an actuating member movably carried by said support, said actuating member being provided with cam slots, said support member being provided with guide slots, pivot pins pivotally securing the sections of said figure together, said pivot pins extending through said guide slots and through said cam slots whereby movement of said sections is under joint control of both of said series of slots, and indicating means carried by said actuating member and visible through an opening in said support to indicate the position assumed by said movable sections.

13. In a device of the character described, a support, a figure supported thereby comprising a plurality of sections, pivot elements pivotally connecting a plurality of said sections, said support being provided with slots and said pivot elements extending through said slots whereby said elements are permitted to move relatively to the support as controlled by said slots, and an actuating member movable with respect to the support and having means cooperating directly with said pivot elements to move said sections.

14. In a device of the character described, a support, a figure supported thereby having the contour of the human body profile and comprising a plurality of sections, pivot elements pivotally connecting a plurality of said sections so that the latter may be moved to exhibit different body postures, said support being provided with slots and said pivot elements extending through said slots whereby said elements are permitted to move relatively to the support as controlled by said slots, and an actuating member movably secured to said support and having cam means engaging said pivot elements to move said elements and thereby the figure sections simultaneously to different positions corresponding to different body postures.

15. A device for posture study comprising a support and a two-dimensional jointed figure having the profile contour of the human body, said figure including among other portions a flat plane chest portion having a head rigid therewith, a flat plane pelvic portion, flat plane abdominal and diaphragm portions, respectively, interposed between said first-named portions and disposed in planes rearwardly of said portions, means for pivoting the chest portion directly to the diaphragm portion, means for pivoting the diaphragm portion directly to the abdominal portion, and means for pivoting said abdominal portion directly to said pelvic portion, said abdominal portion being partially exposed between said pelvic portion and said diaphragm portion, said chest and pelvic portions being movable on their pivots with respect to each other and to the other portions to thereby vary the exposed area of the abdominal portion and thereby demonstrate the effect upon the abdominal region of the body of the fatigue and lordosis postures.

16. A device for posture study comprising a support, a two-dimensional jointed figure thereon having the profile contour of the human body, said figure including among other portions a flat plane chest portion, a flat plane pelvic portion, and an abdominal-representing portion interposed between said portions, all of said portions being pivotally connected together, a support for said portions, and means on said support connected with at least two of said portions for moving the figure to positions corresponding to erect, fatigue and lordosis postures.

17. A device for posture study comprising a support, a two-dimensional jointed figure thereon having the profile contour of the human body, said figure including among other portions a flat plane chest portion, a flat plane pelvic portion, and an abdominal-representing portion interposed between said portions, all of said portions being pivotally connected together, and means connected with at least two of said portions for moving the figure to positions corresponding to erect, fatigue and lordosis postures, said moving means comprising a rotary member on the support having an intermediate position corresponding to the erect posture and movable in opposite directions from said intermediate position to bring the figure to the fatigue and lordosis postures, respectively.

18. A device for posture study comprising a support, a two-dimensional jointed figure thereon having the profile contour of the human body and comprising a plurality of interpivoted portions, and means connected with at least two of said portions for moving the figure to positions corresponding to erect, fatigue, and lordosis postures, said means comprising a movable member mounted on said support and having an intermediate position corresponding to the erect posture.

GERALD McCUE.